United States Patent
Sherman et al.

(10) Patent No.: US 8,133,582 B2
(45) Date of Patent: *Mar. 13, 2012

(54) ADHESIVE COMPOSITION AND ARTICLES MADE THEREFROM

(75) Inventors: Audrey A. Sherman, St. Paul, MN (US); Mieczyslaw H. Mazurek, Roseville, MN (US); Wendi J. Winkler, Minneapolis, MN (US); Erica J. Draheim, Cottage Grove, MN (US); Larry A. Meixner, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/962,273

(22) Filed: Dec. 7, 2010

(65) Prior Publication Data

US 2011/0081505 A1   Apr. 7, 2011

Related U.S. Application Data

(63) Continuation of application No. 11/222,284, filed on Sep. 8, 2005, now Pat. No. 7,862,898.

(51) Int. Cl.
*B32B 7/12* (2006.01)
(52) U.S. Cl. ............ 428/343; 428/355 R; 428/447
(58) Field of Classification Search ............ 428/343, 428/355 R, 447
See application file for complete search history.

(56) References Cited

U.S. PATENT DOCUMENTS

| | | | |
|---|---|---|---|
| 5,091,483 A | 2/1992 | Mazurek et al. | |
| 5,141,790 A | 8/1992 | Calhoun et al. | |
| 5,264,278 A | 11/1993 | Mazurek et al. | |
| 5,314,748 A | 5/1994 | Mazurek et al. | |
| 5,362,516 A | 11/1994 | Wilson et al. | |
| 5,514,730 A * | 5/1996 | Mazurek et al. | ........ 522/99 |
| 5,650,215 A | 7/1997 | Mazurek et al. | |
| 6,020,408 A | 2/2000 | Suzuki et al. | |
| 6,123,890 A | 9/2000 | Mazurek et al. | |
| 6,630,218 B1 | 10/2003 | Abe | |
| 6,838,150 B2 | 1/2005 | Mazurek et al. | |
| 6,958,797 B2 | 10/2005 | Kawahara et al. | |
| 7,862,898 B2 * | 1/2011 | Sherman et al. | ........ 428/447 |
| 2006/0029784 A1 | 2/2006 | Doan et al. | |
| 2006/0057367 A1 | 3/2006 | Sherman et al. | |
| 2007/0054133 A1 | 3/2007 | Sherman et al. | |

FOREIGN PATENT DOCUMENTS

| | | |
|---|---|---|
| EP | 0421643 B1 | 4/1991 |
| JP | 2004269564 A | 9/2004 |
| WO | WO 94/20583 A1 | 9/1994 |

OTHER PUBLICATIONS

Dhoot et al., 2002, *Encyclopedia of Polymer Science and Technology* 5:198-263 "Barrier Polymers".
Galiatsatos, 2006, *Encyclopedia of Polymer Science and Technology* pp. 1-28 "Optical Properties".
Kipp, Dale O, 2004, *Plastic Material Data Sheets. MatWeb—Division of Automation Creation, Inc.* pp. 1-3, Online version available at: http://knovel.com/web/portal/browse/display?_EXT_KNOVEL_DISPLAY_bookid=1023& VerticalID=0.
Privacy film catalog, Jun. 1, 2004 version downloaded on Jan. 5, 2009 from http://web.archive.org/web/20040603185642/decorativefilm.com/OnlineCataloguePage4NewFilms.htm.
Vasile et al., 1993, *Handbook of Polyolefins*, p. 447.

* cited by examiner

*Primary Examiner* — Callie Shosho
*Assistant Examiner* — Elizabeth Robinson
(74) *Attorney, Agent, or Firm* — Elizabeth A. Gallo

(57) ABSTRACT

An adhesive composition comprising from about 2 to about 10 wt. % multifunctional ethylenically unsaturated siloxane polymer, from about 2 to about 10 wt. % monofunctional ethylenically unsaturated siloxane macromer, and from about 85 to about 96 wt. % vinyl monomer is described. The adhesive composition is used to make adhesive articles that, when applied to a substrate, remain removable or repositionable, even after long periods of time. The adhesive composition may be used in transfer adhesive films, and in laminated articles suitable for use in optical applications.

21 Claims, No Drawings

ADHESIVE COMPOSITION AND ARTICLES MADE THEREFROM

CROSS-REFERENCE TO RELATED APPLICATION

This application is a continuation of U.S. application Ser. No. 11/222,284, filed Sep. 8, 2005 by Sherman et al., now U.S. Pat. No. 7,862,898, the entire disclosure being incorporated by reference herein. This application is related to commonly assigned, U.S. patent application Ser. No. 11/222,450, filed Sep. 8, 2005 by Sherman et al., now U.S. Pat. No. 7,892,649, the entire disclosure being incorporated by reference herein.

FIELD OF THE INVENTION

The invention relates to adhesive compositions comprising a mixture of siloxanes and vinyl monomers. The invention also relates to adhesive articles and laminated articles comprising the adhesive compositions.

BACKGROUND

Adhesive articles such as sheets, films, tapes, etc. are often difficult to apply to a substrate in a precise location and without air entrapment, primarily due to preadhesion or "quick stick" behavior of the adhesive. This is particularly true for adhesive articles that have adhesives with high bond strengths and/or low temperature tack properties. Many methods have been developed in order to make application of adhesive articles easier including, for example, the use of application aids such as soapy solutions or talcs. Adhesive articles having embossed or structured adhesive layers have also been developed, as have adhesive layers that are easily removable and/or repositionable.

SUMMARY

An adhesive composition comprising from about 2 to about 10 wt. % multifunctional ethylenically unsaturated siloxane polymer, from about 2 to about 10 wt. % monofunctional ethylenically unsaturated siloxane macromer, and from about 85 to about 96 wt. % vinyl monomer is described. The adhesive composition is used to make adhesive articles that, when applied to a substrate, remain removable or repositionable, even after long periods of time. The adhesive composition may be used in transfer adhesive films, and in laminated articles suitable for use in optical applications.

The adhesive composition comprises a multifunctional ethylenically unsaturated siloxane polymer, a monofunctional ethylenically unsaturated siloxane macromer, and a vinyl monomer. The multifunctional ethylenically unsaturated siloxane polymer is represented by the formula:

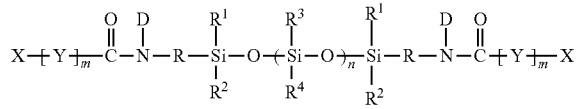

wherein
X is independently a monovalent group having vinyl functionality;
Y is independently a divalent linking group;
D is independently selected from the group consisting of hydrogen, an alkyl group having from about 1 to about 10 carbon atoms, aryl, and substituted aryl;
R is a divalent hydrocarbon group;
$R^1$ is independently selected from the group consisting of alkyl, substituted alkyl, aryl, and substituted aryl;
$R^2$ is independently selected from the group consisting of alkyl, substituted alkyl, aryl, and substituted aryl;
$R^3$ is independently selected from the group consisting of alkyl, substituted alkyl, aryl, substituted aryl, and vinyl;
$R^4$ is independently selected from the group consisting of alkyl, substituted alkyl, aryl, substituted aryl, and vinyl;
m is 0 or 1; and
n is an integer from about 15 to about 1000.

The monofunctional ethylenically unsaturated siloxane macromer is represented by the formula:

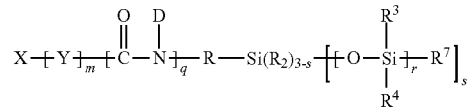

wherein
q is 0 or 1;
s is 1, 2, or 3;
r is an integer from about 15 to about 1000;
$R^7$ is a monovalent group selected from the group consisting of alkyl, substituted alkyl, alkoxy, alkyl amino, hydroxyl, aryl, and substituted aryl;
X is independently a monovalent group having vinyl functionality;
Y is independently a divalent linking group;
D is independently selected from the group consisting of hydrogen, an alkyl group having from about 1 to about 10 carbon atoms, aryl, and substituted aryl;
R is a divalent hydrocarbon group;
$R^2$ is independently selected from the group consisting of alkyl, substituted alkyl, aryl, and substituted aryl;
$R^3$ is independently selected from the group consisting of alkyl, substituted alkyl, aryl, substituted aryl, and vinyl;
$R^4$ is independently selected from the group consisting of alkyl, substituted alkyl, aryl, substituted aryl, and vinyl; and
m is 0 or 1;
with the proviso that when q is 0, Y is

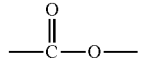

such that X and Y form a (meth)acrylate.

The vinyl monomer may comprise a single monomer or a mixture of more than one monomer. The vinyl monomer may comprises a mixture of soft and hard monomers, wherein the soft monomer is a monomer that when homopolymerized, has a Tg of less than about 0° C., and the hard monomer is a monomer that when homopolymerized, has a Tg of greater than about 0° C. The soft monomer may be an ester of acrylic acid comprising from about 5 to about 21 carbon atoms, an ester of methacrylic acid comprising from about 8 to about 22 carbon atoms, or a combination thereof. The hard monomer may be (meth)acrylic acid, a branched (meth)acrylate, a (meth)acrylate having from about 5 to about 7 carbon atoms, a vinyl ester of a carboxylic acid, a styrene derivative, a (meth)acrylamide derivative, an acrylonitrile derivative, or a combination thereof. In one embodiment, the vinyl monomer comprises isooctyl (meth)acrylate, isobornyl (meth)acrylate, or a combination thereof.

In another embodiment, the adhesive composition comprises from about 2 to about 10 wt. % multifunctional ethylenically unsaturated siloxane polymer, from about 2 to about 10 wt. % monofunctional ethylenically unsaturated siloxane macromer, and from about 85 to about 96 wt. % vinyl monomer.

Also disclosed herein is an adhesive article comprising a first substrate having thereon an adhesive layer, wherein the adhesive layer comprises a cured adhesive composition of a multifunctional ethylenically unsaturated siloxane polymer, a monofunctional ethylenically unsaturated siloxane macromer, and a vinyl monomer; and the first substrate comprises a polymer film, paper, a release liner, a metal film, glass, ceramic, or a combination thereof. The adhesive article may further comprise a release liner adjacent the adhesive layer on the opposite side from the first substrate.

Also disclosed herein is a laminated article comprising a first substrate comprising a polymer film, paper, a metal film, glass, ceramic, or a combination thereof; an adhesive layer adjacent the first substrate and comprising a cured adhesive composition of a multifunctional ethylenically unsaturated siloxane polymer, a monofunctional ethylenically unsaturated siloxane macromer, and a vinyl monomer; and a second substrate adjacent the adhesive layer on the opposite side from the first substrate and comprising a polymer film, paper, a metal film, glass, ceramic, or a combination thereof. The first and/or second substrate may comprise a polarizing film, a prism film, a light guide, a diffusive film, a brightness enhancing film, a liquid crystal display, a glare control film, a transparent surface protective film, a privacy film, or a combination thereof. Also disclosed herein is an optical device comprising the laminated article.

DETAILED DESCRIPTION

Unless otherwise indicated, all numbers expressing feature sizes, amounts, and physical properties used in the specification and claims are to be understood as being modified by the term "about." Accordingly, unless indicated to the contrary, the numerical parameters set forth in the present specification and claims are approximations that can vary depending upon the desired properties sought to be obtained by those skilled in the art utilizing the teachings disclosed herein.

Disclosed herein is an adhesive composition and adhesive article made therefrom that is suitable for use in optical applications. The adhesive article allows a user to make defect-free laminations between two substrates, such that the resulting laminate is suitable for use in optical applications. Upon contact with a substrate, the adhesive layer of the adhesive article spontaneously wets, and by pulling itself down under its own weight, it can wet the entire surface of the substrate. As such, little or no pressure is required during or after the application step. The ease with which spontaneous wetting occurs means that little or no air is entrapped, even around dirt particles if they are small enough to become "wetted" and encapsulated by the adhesive composition. The adhesive composition does not adhere to itself, making handling easy for the user. The adhesive composition is removable and/or repositionable, even after long periods of time.

The adhesive composition disclosed herein comprises a multifunctional ethylenically unsaturated siloxane polymer, a monofunctional ethylenically unsaturated siloxane macromer, and a vinyl monomer. The multifunctional ethylenically unsaturated siloxane polymer has the formula I:

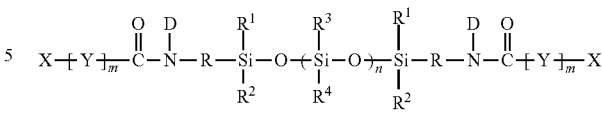

I wherein

X is independently a monovalent group having vinyl functionality;

Y is independently a divalent linking group;

D is independently selected from the group consisting of hydrogen, an alkyl group having from about 1 to about 10 carbon atoms, aryl, and substituted aryl;

R is a divalent hydrocarbon group;

$R^1$ is independently selected from the group consisting of alkyl, substituted alkyl, aryl, and substituted aryl;

$R^2$ is independently selected from the group consisting of alkyl, substituted alkyl, aryl, and substituted aryl;

$R^3$ is independently selected from the group consisting of alkyl, substituted alkyl, aryl, substituted aryl, and vinyl;

$R^4$ is independently selected from the group consisting of alkyl, substituted alkyl, aryl, substituted aryl, and vinyl;

m is 0 or 1; and n is an integer from about 15 to about 1000.

One example of the multifunctional ethylenically unsaturated siloxane polymer, referred to as 5kMAUS, is wherein X is

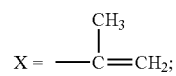

Y is

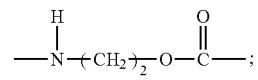

D is hydrogen;

R is

—CH$_2$CH$_2$CH$_2$—;

$R^1$, $R^2$, $R^3$, and $R^4$ are —CH$_3$;

m is 1; and n is an integer from about 15 to about 1000; and

X and Y form a methacrylate.

Another example of the multifunctional ethylenically unsaturated siloxane polymer is wherein X is

X=—CH=CH$_2$;

Y is

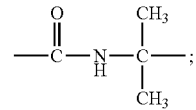

D is hydrogen;

R is

—CH$_2$CH$_2$CH$_2$—;

$R^1$, $R^2$, $R^3$, and $R^4$ are —$CH_3$;
m is 1; and
n is an integer from about 15 to about 1000; and
X and Y form an acrylamide.

Another example of the multifunctional ethylenically unsaturated siloxane polymer is wherein
X is

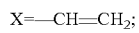
X=—CH=$CH_2$;

D is hydrogen;
R is

—$CH_2CH_2CH_2$—;

$R^1$, $R^2$, $R^3$, and $R^4$ are —$CH_3$;
m is 0; and
n is an integer from about 15 to about 1000.

Still another example of the multifunctional ethylenically unsaturated siloxane polymer is wherein
X is independently

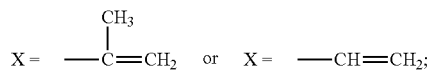

Y is independently

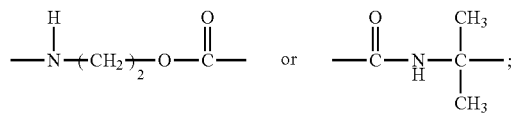

D is hydrogen;
R is

—$CH_2CH_2CH_2$—;

$R^1$, $R^2$, $R^3$, and $R^4$ are —$CH_3$;
m is 0 or 1;
n is an integer from about 15 to about 1000; and
X and Y form either a (meth)acrylate or a (meth)acrylamide.

The multifunctional ethylenically unsaturated siloxane polymers described above may be prepared as described in U.S. Pat. No. 5,314,748 and WO 94/20583, the disclosures of which are incorporated herein by reference. The amount of multifunctional ethylenically unsaturated siloxane polymer used in the adhesive composition may be up to about 45 wt. %. The amount of multifunctional ethylenically unsaturated siloxane polymer used in the adhesive composition may be also be from 2 to about 35 wt. %, or from 4 to about 20 wt. %.

The monofunctional ethylenically unsaturated siloxane macromer has the formula II:

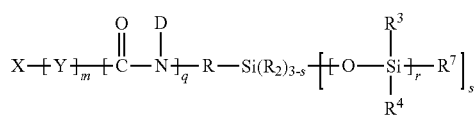

wherein
q is 0 or 1;
s is 1, 2, or 3;
r is an integer from about 15 to about 1000;
$R^7$ is a monovalent group selected from the group consisting of alkyl, substituted alkyl, alkoxy, alkyl amino, hydroxyl, aryl, and substituted aryl;

X is independently a monovalent group having vinyl functionality;
Y is independently a divalent linking group;
D is independently selected from the group consisting of hydrogen, an alkyl group having from about 1 to about 10 carbon atoms, aryl, and substituted aryl;
R is a divalent hydrocarbon group;
$R^2$ is independently selected from the group consisting of alkyl, substituted alkyl, aryl, and substituted aryl;
$R^3$ is independently selected from the group consisting of alkyl, substituted alkyl, aryl, substituted aryl, and vinyl;
$R^4$ is independently selected from the group consisting of alkyl, substituted alkyl, aryl, substituted aryl, and vinyl; and
m is 0 or 1;
with the proviso that when q is 0, Y is

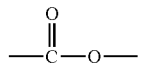

such that X and Y form a (meth)acrylate.

In one embodiment, the monofunctional ethylenically unsaturated siloxane macromer has a molecular weight of about 10,000 such that r is from about 120 to about 150. In another embodiment, r is from about 130 to about 135; this monofunctional ethylenically unsaturated siloxane macromer is referred to as 10kMAC. Preparation of monofunctional ethylenically unsaturated siloxane macromers may be found in WO 94/20583, the disclosure of which is incorporated herein by reference. The amount of monofunctional ethylenically unsaturated siloxane macromer used in the adhesive composition may be up to about 45 wt. %. The amount of monofunctional ethylenically unsaturated siloxane macromer used in the adhesive composition may be also be from 2 to about 35 wt. %, or from 4 to about 20 wt. %.

The vinyl monomer may comprise a single monomer or a mixture of more than one monomer. A variety of vinyl monomers may be used in the adhesive composition. In one embodiment, the vinyl monomer comprises a mixture of soft and hard monomers, wherein the soft monomer is a monomer that when homopolymerized, has a Tg of less than about 0° C., and the hard monomer is a monomer that when homopolymerized, has a Tg of greater than about 0° C.

In general, the soft monomer is chosen such that a tacky or tackiflable adhesive composition may be obtained. Examples of soft monomers include esters of acrylic acid comprising from about 5 to about 21 carbon atoms, esters of methacrylic acid comprising from about 8 to about 22 carbon atoms, and combinations thereof. For example, the soft monomers may be isooctyl acrylate, 2-ethylhexyl acrylate, butyl acrylate, 2-methylbutyl acrylate, 4-methyl-2-pentyl acrylate, sec-butyl acrylate, isononyl acrylate, isodecyl acrylate, or mixtures thereof.

In general, the hard monomer is chosen such that cohesive strength of adhesive composition may be obtained. Examples of hard monomers include (meth)acrylic acid, branched (meth)acrylates, (meth)acrylates having from about 5 to about 7 carbon atoms, vinyl esters of a carboxylic acid, styrene derivatives, (meth)acrylamide derivatives, acrylonitrile derivatives, or a combination thereof. For example, the hard monomers may be cyclohexyl (meth)acrylate, isobornyl (meth)acrylate, t-butyl (meth)acrylate, vinyl acetate, isopropenyl acetate, styrene, vinyl toluene, hydroxyethyl (meth) acrylate, hydroxypropyl (meth)acrylate, N,N-dimethylacrylamide, (meth)acrylonitrile, N-vinyl pyrrolidone, N-vinyl caprolactam, vinylidene chloride, or a combination thereof.

In one embodiment, the vinyl monomer comprises isooctyl (meth)acrylate, isobornyl (meth)acrylate, or a combination thereof.

The amount of vinyl monomer in the adhesive composition may be from about 55 to about 98 wt. % relative to the total amount of the adhesive composition. For mixtures of soft and hard monomers, the soft monomer may be from about 30 to about 98 wt. % of the total amount of the vinyl monomers.

In one embodiment, the adhesive composition may comprise from about 2 to about 10 wt. % multifunctional ethylenically unsaturated siloxane polymer, from about 2 to about 10 wt. % monofunctional ethylenically unsaturated siloxane macromer, and from about 85 to about 96 wt. % vinyl monomer.

One or more crosslinkers may be used in the adhesive composition. Examples of crosslinkers include 1,6-hexanediol di(meth)acrylate; 1,4-butanediol diacrylate; and trimethylolpropane triacrylate. In general, the amount of crosslinker is less than about 5 wt. % relative to the total weight of the adhesive composition.

Small amounts of a non-reactive diluent may be added to the adhesive composition in order to improve homogeneity. Examples of suitable diluents that do not interfere with polymerization of the mixture include ethyl acetate, cyclohexane, hexane, toluene, butyl acetate, and octamethylcyclotetrasiloxane. If used, the diluent may comprise from about 1 to about 20 wt. % based upon the total weight of the multifunctional vinyl siloxane, the vinyl monomer, the macromer, and the photoinitiator. The particular diluent and amount used should provide homogeneity without requiring an extensive post-polymerization drying step.

Any conventional coating method may be used to coat the adhesive composition, e.g., roll coating, knife coating, curtain coating, or extrusion. The adhesive composition is typically coated between a first substrate and a release liner, and cured during and/or after the coating process. The resulting adhesive layer may be from about 5 um (0.2 mil) to about 508 um (20 mil).

The adhesive layer comprises a cured adhesive layer of a multifunctional ethylenically unsaturated siloxane polymer, a monofunctional ethylenically unsaturated siloxane macromer, and a vinyl monomer. UV radiation may be used for curing, for example, by using fluorescent black light bulbs as described in U.S. Pat. No. 4,181,752; these bulbs provide a rate of irradiation in the 300 to 400 nm wavelength region of not more than 7 milliwatts per square centimeter, and hence are characterized as low intensity. Suitable photoinitiators include benzoin ethers, benzophenone and derivatives thereof, acetophenone derivatives, camphorquinone, and mixtures thereof. Polymerization may also be carried out using thermal radiation in the presence of a thermal initiator. Suitable thermal initiators include peroxides, e.g., lauroyl peroxide, azo compounds, e.g., azo-bis-isobutyronitrile, persulfates, e.g., sodium persulfate and potassium persulfate. In general, photoinitiators and thermal initiators comprise no more than about 5 wt. % relative to the total weight of the adhesive layer.

Disclosed herein is an adhesive article comprising a first substrate having thereon an adhesive layer, wherein the adhesive layer comprises a cured adhesive composition of a multifunctional ethylenically unsaturated siloxane polymer, a monofunctional ethylenically unsaturated siloxane macromer, and a vinyl monomer; and the first substrate comprises a polymer film, paper, a metal film, glass, ceramic, or a combination thereof. The first substrate may comprise a polarizing film, a prism film, a light guide, a diffusive film, a brightness enhancing film, a liquid crystal display, a glare control film, a transparent surface protective film, a privacy film, or a combination thereof. The adhesive article may further comprise a release liner adjacent the adhesive layer on the opposite side from the first substrate. The adhesive layer may have a microstructured surface that forms an array or pattern, wherein the adhesive layer is substantiously continuous, and the release liner is a microstructured release liner.

Disclosed herein is a laminated article comprising: a first substrate comprising a polymer film, paper, a metal film, glass, ceramic, or a combination thereof; an adhesive layer adjacent the first substrate and comprising a cured adhesive composition of a multifunctional ethylenically unsaturated siloxane polymer, a monofunctional ethylenically unsaturated siloxane macromer, and a vinyl monomer; and a second substrate adjacent the adhesive layer on the opposite side from the first substrate and comprising a polymer film, paper, a metal film, glass, ceramic, or a combination thereof. The first and/or second substrate may comprise a polarizing film, a prism film, a light guide, a diffusive film, a brightness enhancing film, a liquid crystal display, a glare control film, a transparent surface protective film, a privacy film, or a combination thereof.

The first and/or second substrates may be an optical film, i.e., a film that manages light passing therethrough. Examples of optical films include a polarizing film, a prism film, a light guide, a diffusive film, a brightness enhancing film, a liquid crystal display, a glare control film, a transparent surface protective film, or a combination thereof. For a more detailed description of useful optical films, see U.S. application Ser. No. 10/914,555, the disclosure of which is incorporated herein by reference.

The first and/or second substrates may be clear or opaque, or they may have varying degrees of transparency depending on the particular application, function, use, etc. For example, the first and/or second substrates may have a visible light transmission of 40% or greater, 70% or greater, 90% or greater, or 95% or greater. The optical substrates may also have any haze value, for example, 15% or less, 5% or less, or 1% or less.

The first and/or second substrates may comprise a polymer film comprising one or more polymers such as cellulose acetate butyrate, cellulose acetate propionate, cellulose triacetate, poly(meth)acrylate, polyether sulfone, polymethyl methacrylate, polyurethane, polyester, polycarbonate, polyvinyl chloride, syndiotactic polystyrene, cyclic olefin copolymers, polyethylene terephthalate, polyethylene naphthalate, and copolymers or blends based on naphthalene dicarboxylic acids.

The release liner may be any release liner or transfer liner known to those skilled in the art and that is capable of being placed in intimate contact with the adhesive layer and subsequently removed without damaging the adhesive layer. Examples of release liners include materials from 3M Company; Loparex, P.S Substrates, Inc., Schoeller Technical Papers, Inc., AssiDoman Inncoat GMBH, and P. W. A. Kunstoff GMBH. The release liner can be a polymer-coated paper with a release coating, a polyethylene coated polyethylene terepthalate film with a release coating, or a cast polyolefin film with a release coating.

The release liner may be flat having at least one smooth surface, or it may be microstructured having at least one microstructured surface; these surfaces are disposed so that the smooth or microstructured surface is adjacent the adhesive layer.

In one embodiment, the adhesive article may be an adhesive transfer tape wherein the adhesive composition is disposed between two release liners.

The microstructured surface comprises microstructures having at least two lateral dimensions (i.e. dimensions in the plane of the film) less than 1.4 mm (55 mils), made as described, for example, in U.S. Pat. Nos. 6,197,397 and 6,123,890, which are incorporated herein by reference. The microstructured surface may comprise, for example, a series of shapes including ridges, posts, pyramids, hemispheres and cones, and/or they may be protrusions or depressions having flat, pointed, truncated, or rounded parts, any of which may have angled or perpendicular sides relative to the plane of the surface. The microstructured surface may have a pattern, be random, or a combination thereof. The microstructured surface may impart substantially continuous open pathways or grooves into the adhesive composition layer from an exposed surface. The microstructured surface may be non-adhesive as described in U.S. Pat. Nos. 5,296,277; 5,362,516; and 5,141,790.

The properties of the optical articles disclosed herein may depend on the particular application. Haze of useful optical articles may be 15% or less, 10% or less, 5% or less, 3% or less, or 1% or less, or 0 to 1%. Visible light transmission of useful optical articles may be in a range of 40% or greater, 50% or greater, or 70% or greater, 80% or greater, 90% or greater, or 95% or greater.

Disclosed herein is an optical device comprising any of the laminated articles described above. Examples of optical devices include hand-held device such as cellular phones, personal data assistants, and electronic games; larger size devices such as laptop computers, computer monitors, televisions, etc. or any other light management device.

EXAMPLES

Preparation of Adhesive Compositions

Various adhesive compositions comprising isooctyl acrylate (IOA), 5kMAUS, and 10kMAC were prepared as described in Table 1. 5kMAUS and 10kMAC were prepared as described in WO 94/20583.

TABLE 1

| Adhesive Composition | IOA (Wt. %) | 5kMAUS (Wt. %) | 10kMAC (Wt. %) |
|---|---|---|---|
| 1 | 95 | 2.0 | 3.0 |
| 2 | 90 | 5.0 | 5.0 |
| 3 | 90 | 3.0 | 7.0 |
| 4 | 90 | 7.0 | 3.0 |
| Comparative 1 | 97.5 | 2.5 | 0 |
| Comparative 2 | 95 | 5.0 | 0 |
| Comparative 3 | 90 | 10.0 | 0 |
| Comparative 4[1] | 95 | 0 | 5 |
| Comparative 5[1] | 90 | 0 | 10 |
| Control[1] | 100 | 0 | 0 |

[1]Plus 0.25 wt. % of 1,6-hexanediol diacrylate.

Evaluation of Peel Adhesion

Adhesive articles comprising the adhesive compositions described in Table 1 were prepared by coating each adhesive composition at a thickness of 2 mil between a release liner and a 5 mil 618 type polyethylene terephthalate (PET) film (from ICI) using a set gap on a notch bar. Two different release liners were used. One was a flat release liner of 2 mil PET with silicone release layer. The other was a microstructured release liner having an intersecting ridges that form contiguous square pyramids in the adhesive surface. The dimensions were 200 um base with 8 degree sidewall angles. The adhesive articles were then cured through the PET releaser liner using UV blacklight for 10 minutes for a total dose of about 1000 mJ/cm$^2$.

For each adhesive article, a strip (2.5 cm by 20 cm) was cut, and the liner removed to expose the adhesive layer, which was then laminated using a 1.7 kg (4.5 lb.) rubber roller, to window glass that had been cleaned with isopropanol and Kimwipes® (Kimberly Clark). A tab of 1 to 2.5 cm was extended beyond the end of the glass. The roller was positioned at one end, and slowly rolled down and back in about 3 seconds without any additional pressure. The laminate was visually inspected in order to ensure that 100% wet-out had been obtained (no gross bubble could be seen with the naked eye).

For each laminate, a piece of 898 type glass fiber reinforced strapping tape (2.5 cm by 30 cm) was applied to the free end of the PET layer extending beyond the glass and double-backed upon itself, adhesive to adhesive, as an extension to the jaws of the test jig. The 90° peel adhesion was tested using a SP2000 peel tester (from IMASS) with a 90° attachment, with conditions 229 cm/min (90 inch/min), 2 second delay, and 2 second data acquisition. Three tests were performed for each laminate, and average values are reported in Table 2. The laminates having the microstructed silicone-coated release liner were then aged by storing them flat in single layers with spacers in between, in order to prevent contact with each other. After 7 days the 90° peel adhesion was measured and the results are reported in Table 2.

TABLE 2

| Adhesive Composition | Liner | Initial Adhesion Force (g/inch) | Adhesion Force After 1 Wk, RT (g/inch) |
|---|---|---|---|
| 1 | flat | 155 | NM |
| 2 | flat | 60 | NM |
| 2 | microstructured | 55 | 83 |
| 3 | flat | 40 | NM |
| Comparative 1 | microstructured | 214 | 180 |
| Comparative 2 | flat | 275 | 260 |
| Comparative 2 | microstructured | 143 | 142 |
| Comparative 3 | flat | 160 | 225 |
| Comparative 3 | microstructured | 81 | 83 |
| Comparative 4 | flat | 55 | NM |
| Comparative 5 | flat | 70 | NM |
| Control | flat | 275 | NM |
| Control | microstructured | 401 | 327 |

NM = not measured

The data in Table 2 show that the adhesive compositions of the invention are easily removable, even after 1 week at room temperature.

Evaluation of Wet-Out Speed

Adhesive articles were prepared as described above. For each sample, a 2.5 cm by 20 cm strip was cut from the liner side, using a double blade cutter. The liner was removed, and the strip placed adhesive side up on a bench. One end of the strip extended past the edge of the bench about 2.5 cm. Spacers about 2 mm thick were placed alongside the strip and a cleaned glass plate placed over the strip on the spacers. A squeegee was used to initiate contact between the strip and glass to the edge of the bench. Usually, the adhesive did not wet beyond the forced contact line, which was perpendicular to the length of the strip. The glass, with strip attached by one end, was quickly turned over and a stopwatch started, or time noted to 1 sec. This method eliminates any 'slap down' effect of placing a strip directly on face up glass. The line of wetting was immediately marked on the glass, close to the edge of the strip to indicate initial position of the wetting front. The fastest wetting adhesives could start to advance while upside down and had to be turned and marked quickly. The wetting front was observed to progress down the strip and the position marked and time noted. The wetting front should move about 5 cm or more for reliable results, but not to the end of the strip. The distance between the marks was measured and divided by the time to get wetting speed (cm/min). Results are shown in Table 3.

TABLE 3

| Adhesive Composition | Liner | Length (cm) | Time (min) | Wet-out Speed (cm/min) |
|---|---|---|---|---|
| 1 | flat | 9.0 | 1.00 | 9.0 |
| 2 | flat | 12.8 | 0.75 | 17.1 |
| 2 | micro-structured | 12.5 | 1.50 | 8.3 |
| 3 | flat | 14.7 | 0.75 | 19.6 |
| 4 | flat | 15.0 | 0.75 | 20.0 |
| Comparative 2 | flat | 4.8 | 2.00 | 2.4 |
| Comparative 2 | micro-structured | 9.3 | 5.00 | 1.9 |
| Comparative 3 | flat | 4.7 | 2.00 | 2.4 |
| Comparative 3 | micro-structured | 1.0 | 55.00 | 0.02 |
| Comparative 4 | flat | 12.8 | 1.0 | 12.8 |
| Comparative 5 | flat | 13.3 | 0.50 | 26.6 |

The data in Table 3 show that wet-out speed increases if the monofunctional ethylenically unsaturated siloxane macromer is used.

Various modifications and alterations of the invention will become apparent to those skilled in the art without departing from the spirit and scope of the invention.

What is claimed is:

1. An adhesive composition comprising from about 2 to about 10 wt. % multifunctional ethylenically unsaturated siloxane polymer, from about 2 to about 10 wt. % monofunctional ethylenically unsaturated siloxane macromer, and from about 85 to about 96 wt. % vinyl monomer.

2. The adhesive composition of claim 1, wherein the multifunctional ethylenically unsaturated siloxane polymer is represented by the formula:

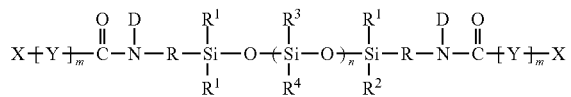

wherein
- X is independently a monovalent group having vinyl functionality;
- Y is independently a divalent linking group;
- D is independently selected from the group consisting of hydrogen, an alkyl group having from about 1 to about 10 carbon atoms, aryl, and substituted aryl;
- R is a divalent hydrocarbon group;
- $R^1$ is independently selected from the group consisting of alkyl, substituted alkyl, aryl, and substituted aryl;
- $R^2$ is independently selected from the group consisting of alkyl, substituted alkyl, aryl, and substituted aryl;
- $R^3$ is independently selected from the group consisting of alkyl, substituted alkyl, aryl, substituted aryl, and vinyl;
- $R^4$ is independently selected from the group consisting of alkyl, substituted alkyl, aryl, substituted aryl, and vinyl;
- m is 0 or 1; and
- n is an integer from about 15 to about 1000.

3. The adhesive composition of claim 2, wherein X is

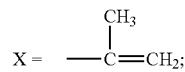

Y is

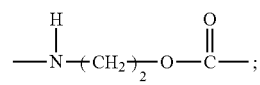

D is hydrogen;
R is

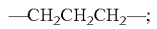

$R^1$, $R^2$, $R^3$, and $R^4$ are —$CH_3$;
m is 1; and
n is an integer from about 15 to about 1000; and
X and Y form a methacrylate.

4. The adhesive composition of claim 2, wherein X is

Y is

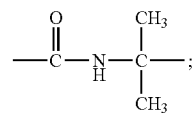

D is hydrogen;
R is

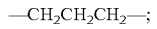

$R^1$, $R^2$, $R^3$, and $R^4$ are —$CH_3$;
m is 1; and
n is an integer from about 15 to about 1000; and
X and Y form an acrylamide.

5. The adhesive composition of claim 2, wherein X is

D is hydrogen;
R is

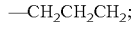

$R^1$, $R^2$, $R^3$, and $R^4$ are —$CH_3$;
m is 0; and
n is an integer from about 15 to about 1000.

6. The adhesive composition of claim 2, wherein X is independently

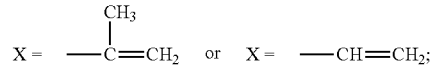

Y is independently

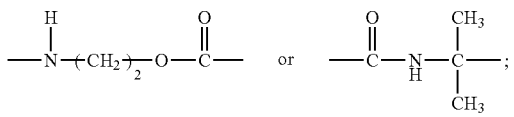

D is hydrogen;
R is

—CH₂CH₂CH₂—;

R¹, R², R³, and R⁴ are —CH₃;
m is 0 or 1;
n is an integer from about 15 to about 1000; and
X and Y form either a (meth)acrylate or a (meth)acrylamide.

7. The adhesive composition of claim 1, wherein the monofunctional ethylenically unsaturated siloxane macromer has the formula:

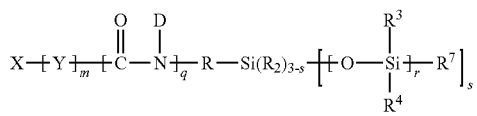

wherein
q is 0 or 1;
s is 1, 2, or 3;
r is an integer from about 15 to about 1000;
$R^7$ is a monovalent group selected from the group consisting of alkyl, substituted alkyl, alkoxy, alkyl amino, hydroxyl, aryl, and substituted aryl;
X is independently

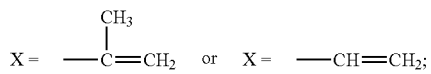

Y is independently

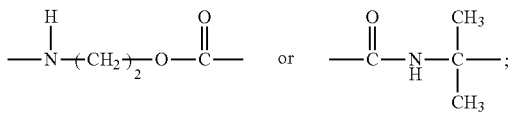

D is independently selected from the group consisting of hydrogen, an alkyl group having from about 1 to about 10 carbon atoms, aryl, and substituted aryl;
R is a divalent hydrocarbon group;
$R_2$ is independently selected from the group consisting of alkyl, substituted alkyl, aryl, and substituted aryl;
$R^3$ is independently selected from the group consisting of alkyl, substituted alkyl, aryl, substituted aryl, and vinyl;
$R^4$ is independently selected from the group consisting of alkyl, substituted alkyl, aryl, substituted aryl, and vinyl; and
m is 0 or 1;
with the proviso that when q is 0, Y is

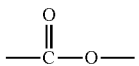

such that X and Y form a (meth)acrylate.

8. The adhesive composition of claim 7, wherein r is from about 120 to about 150.

9. The adhesive composition of claim 7, wherein r is from about 130 to about 135.

10. The adhesive composition of claim 1, wherein the vinyl monomer comprises a single monomer or a mixture of more than one monomer.

11. The adhesive composition of claim 10, wherein the vinyl monomer comprises a mixture of soft and hard monomers, wherein
the soft monomer is a monomer that when homopolymerized, has a Tg of less than about 0° C., and
the hard monomer is a monomer that when homopolymerized, has a Tg of greater than about 0° C.

12. The adhesive composition of claim 11, wherein the soft monomer is an ester of acrylic acid comprising from about 5 to about 21 carbon atoms, an ester of methacrylic acid comprising from about 8 to about 22 carbon atoms, or a combination thereof.

13. The adhesive composition of claim 12, wherein the soft monomer is isooctyl acrylate, 2-ethylhexyl acrylate, butyl acrylate, 2-methylbutyl acrylate, 4-methyl-2-pentyl acrylate, sec-butyl acrylate, isononyl acrylate, isodecyl acrylate, or mixtures thereof.

14. The adhesive composition of claim 11, wherein the hard monomer is (meth)acrylic acid, a branched (meth)acrylate, a (meth)acrylate having from about 5 to about 7 carbon atoms, a vinyl ester of a carboxylic acid, a styrene derivative, a (meth)acrylamide derivative, an acrylonitrile derivative, or a combination thereof.

15. The adhesive composition of claim 14, wherein the hard monomer is cyclohexyl (meth)acrylate, isobornyl (meth)acrylate, t-butyl (meth)acrylate, vinyl acetate, isopropenyl acetate, styrene, vinyl toluene, hydroxyethyl (meth)acrylate, hydroxypropyl (meth)acrylate, N,N-dimethylacrylamide, (meth)acrylonitrile, N-vinyl pyrrolidone, N-vinyl caprolactam, vinylidene chloride, or a combination thereof.

16. The adhesive composition of claim 1, wherein the vinyl monomer comprises isooctyl (meth)acrylate, isobornyl (meth)acrylate, or a combination thereof.

17. An adhesive article comprising a first substrate having thereon an adhesive layer, wherein
the adhesive layer comprises a cured adhesive composition of from about 2 to about 10 wt. % multifunctional ethylenically unsaturated siloxane polymer, from about 2 to about 10 wt. % monofunctional ethylenically unsaturated siloxane macromer, and from about 85 to about 96 wt. % vinyl monomer; and
the first substrate comprises a polymer film, paper, a metal film, glass, ceramic, or a combination thereof.

18. The adhesive article of claim 17, wherein the first substrate comprises a polarizing film, a prism film, a light guide, a diffusive film, a brightness enhancing film, a liquid crystal display, a glare control film, a transparent surface protective film, a privacy film, or a combination thereof.

19. The adhesive article of claim 17, further comprising a release liner adjacent the adhesive layer on the opposite side from the first substrate.

20. The adhesive article of claim 19, wherein the release liner is a microstructured release liner.

21. An optical device comprising the adhesive article of claim 17.

* * * * *

UNITED STATES PATENT AND TRADEMARK OFFICE
CERTIFICATE OF CORRECTION

PATENT NO.       : 8,133,582 B2
APPLICATION NO.  : 12/962273
DATED            : March 13, 2012
INVENTOR(S)      : Audrey A Sherman It is certified that error appears in the above-identified patent and that said Letters Patent is hereby corrected as shown below:

In the Specification

Column 8
Line 6, Delete "substantiously" and insert -- substantially --, therefor.
Line 58, Delete "terepthalate" and insert -- terephthalate --, therefor.

Column 10
Line 23, Delete "microstructed" and insert -- microstructured --, therefor.

In the Claims

Column 11
Line 47, in Claim 2, delete " 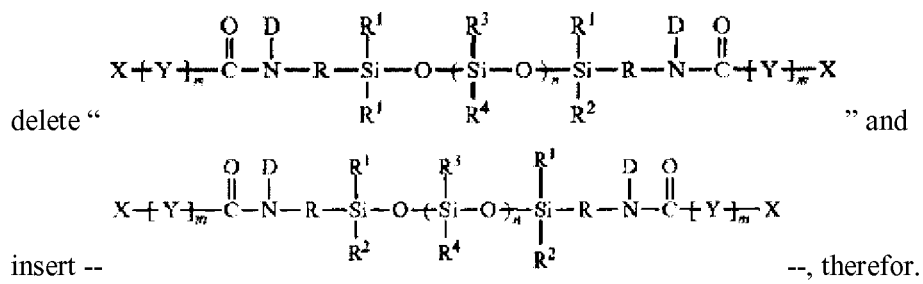 " and insert -- -- therefor.

Column 12
Line 55, In Claim 5, delete "—CH$_2$CH$_2$CH$_2$;" and
insert -- —CH$_2$CH$_2$CH$_2$—; --, therefor.

Signed and Sealed this
Eighteenth Day of February, 2014

Michelle K. Lee
*Deputy Director of the United States Patent and Trademark Office*